United States Patent [19]

Weber et al.

[11] 4,343,756

[45] Aug. 10, 1982

[54] PROCESS FOR THE PRODUCTION OF CAST FILMS FROM POLYARYL SULPHONE/POLYCARBONATE MIXTURES

[75] Inventors: Hans-Leo Weber, Rommerskirchen; Eckart Reese, Dormagen; Hans Kaloff, Dormagen; Hans-Josef Fausten, Dormagen, all of Fed. Rep. of Germany

[73] Assignee: Bayer Aktiengesellschaft, Leverkusen, Fed. Rep. of Germany

[21] Appl. No.: 207,583

[22] Filed: Nov. 17, 1980

[30] Foreign Application Priority Data

Dec. 4, 1979 [DE] Fed. Rep. of Germany ....... 2948673

[51] Int. Cl.$^3$ .............................................. B29D 7/02
[52] U.S. Cl. ................................... 264/216; 264/288.4; 525/906; 525/462; 524/537; 524/376
[58] Field of Search ................. 264/216, 288.4; 525/1, 525/906

[56] References Cited

U.S. PATENT DOCUMENTS

| 3,365,517 | 1/1968 | Barth | 525/906 |
| 3,431,230 | 3/1969 | Jackson, Jr. et al. | 525/1 |
| 4,152,367 | 5/1979 | Binsack et al. | 260/860 |

FOREIGN PATENT DOCUMENTS

| 733 | 2/1979 | European Pat. Off. . |
| 2735144 | 2/1979 | Fed. Rep. of Germany . |

*Primary Examiner*—James B. Lowe
*Attorney, Agent, or Firm*—Gene Harsh; Lawrence S. Pope; Aron Preis

[57] ABSTRACT

Mixtures of polyaryl sulphones and polycarbonates solutions made stable by the introduction of solubilizing agents are used to prepare cast films of improved properties.

2 Claims, No Drawings

PROCESS FOR THE PRODUCTION OF CAST FILMS FROM POLYARYL SULPHONE/POLYCARBONATE MIXTURES

FIELD OF THE INVENTION

The invention relates to cast films and particularly to cast films of polyaryl sulphone/polycarbonate mixtures.

DESCRIPTION OF THE PRIOR ART

Mixtures of 90 to 60% by weight of a linear polysulphone and 10 to 40% by weight of a linear polycarbonate having a $\overline{M}w$ (weight-average molecular weight) greater than 60,000 are described in German Offenlegungsschrift No. 2,735,144 and European Offenlegungsschrift No. 0,000,733.

The proportions in the mixture are preferably between 85 to 70% by weight of polyaryl sulphone and between 15 and 30% by weight of polycarbonate.

Cast films produced from these mixtures have inadequate mechanical properties and a marked tendency to stress-cracking.

SUMMARY OF THE INVENTION

The present invention relates to a process for the production of cast films from the above-mentioned polyaryl sulphone/polycarbonate mixtures, which process is characterized in that, before the production of the cast films, solutions of the polyaryl sulphones and of the polycarbonates are stablized by adding a solubilizing agent in amounts of 20% by weight, relative to the solid employed, and the cast films which are then produced by customary processes are then dried and stretched by customary processes at a stretching ratio of between 1:2 and 1:5 and at a temperature above the transition temperature of the polyaryl sulphone/polycarbonate mixtures.

DETAILED DESCRIPTION OF THE INVENTION

Solvents used for the solutions of the polyaryl sulphones are, for example, methylene chloride, ethylene chloride, trichloroethane and chloroform.

Solvents used for the solutions of the polycarbonates are, for example, methylene chloride, ethylene chloride, trichloroethane, chloroform, m-cresol and pyridine.

The solutions of the polyaryl sulphone/polycarbonate mixtures for the production of cast films have concentrations of between 10% and 30%, preferably between 20% and 25%. They can be prepared in a known manner.

Solubilizing agents in the context of the present invention are ethylene-glycol-monomethyl-ether and toluene.

The solubilizing agents are added to the polyaryl sulphone/polycarbonate casting solutions to be stablized in amounts of 5 to 30% by weight, preferably 20% by weight, relative to the solid employed, during or after the preparation of the polyaryl sulphone/polycarbonate solutions.

The solutions can be cast into films in a known manner on known drum casting or belt casting machines.

The cast films obtained are between 4 μm and 300 μm thick, preferably between 6 μm and 180 μm thick. They can be dried in the customary manner at temperatures between 70° C. and 140° C.

The stretching of films is known in the art and is applied in the production of various films, for example polypropylene films and polyester films. Stretching, as a rule, increases the strength of the material, while at the same time decreases its elongation at break.

It could not have been predicted that, in the practice according to the invention, the elongation at break can be distinctly improved in both the longitudinal and transverse directions by stretching the film longitudinally on customary apparatus and that the tendency towards stress-cracking will be significantly reduced.

Stretching can be carried out on customary apparatuses such as, for example, roller stretching machines and edge-stretching machines which permit stretching in a ratio of 1:2 to 1:5. Single-nip and multi-nip stretching machines can be used.

The stretching is carried out at temperatures between 190° C. and 220° C., preferably between 200° C. and 215° C., the glass transition temperature of the components being 149° C. for the polycarbonate and 187° C. for the polyaryl sulphone.

The stretched cast films obtainable according to the invention are between 1 μm and 100 μm thick, preferably between 2 μm and 60 μm thick.

Polyaryl sulphones which are suitable according to the invention are, in principle, all the known linear aromatic polysulphones and polyether sulphones having a Mw (weight-average molecular weight, measured, for example, by means of light scattering) of between about 15,000 and about 55,000, preferably between about 20,000 and about 40,000, such as are described in the above-mentioned German Offenlengungsschrift No. 2,735,144 and European Offenlegungsschrift No. 0,000,773.

Polycarbonates which are suitable according to the invention are aromatic homopolycarbonates and aromatic copolycarbonates based, for example, on one or more of the following diphenols: hydroquinone, resorcinol, dihydroxydiphenyls, bis-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphoxides, bis-(hydroxyphenyl)-sulphones and α,α'-bis-(hydroxyphenyl)-diisopropylbenzenes and nuclear-alkylated and nuclear-halogenated derivatives thereof. These and other suitable diphenols are described, for example, in U.S. Pat. No. 3,028,365, in German Offenlegungsschrift No. 2,063,050 and in the monograph, "H. Schnell, Chemistry and Physics of Polycarbonates, Interscience Publishers, New York, 1964", all incorporated by reference.

The aromatic polycarbonates can be prepared by known processes, thus, for example, from bisphenol and diphenyl carbonate by the melt transesterification process and from bisphenols and phosgene by the two-phase boundary process as described in the above-mentioned literature.

The weight-average molecular weights of the polycarbonates which are suitable according to the invention should be above 60,000, preferably between 65,000 and 120,000 and, in particular, between 75,000 and 110,000 (determined from the intrinsic viscosity, measured in $CH_2Cl_2$ solution).

Aromatic polycarbonates in the context of the invention are, in particular, homopolycarbonates of bis-2-(4-hydroxyphenyl)-propane (bisphenol A) and copolycarbonates of at least 30 mol %, preferably at least 60 mol % and, in particular, at least 80 mol %, of bisphenol A and up to 70 mol %, preferably up to 40 mol % and, in particular, up to 20 mol %, of other diphenols. (The mol percentages in each case relate to the total molar amount of co-condensed diphenols).

Other diphenols which are suitable are bis-(hydroxyaryl)-$C_1$-$C_8$-alkanes other than bisphenol A and bis-(hydroxyaryl)-$C_5$-$C_6$-cycloalkanes, in particular bis-(4-hydroxyphenyl)-$C_1$-$C_8$-alkanes and bis-(4-hydroxyphenyl)-$C_5$-$C_6$-cycloalkanes.

Examples of other buitable diphenols are bis-(4-hydroxyphenyl)-methane (bisphenol F); 2,4-bis-(4-hydroxyphenyl)-butane; 1,1-bis-(4-hydroxyphenyl)-cyclohexane; 2,2-bis-(3-methyl-4-hydroxyphenyl)-propane; bis-(3,5-dimethyl-4-hydroxyphenyl)-methane; 2,2-bis-(3,5-dimethyl-4-hydroxyphenyl)-propane; 2,4-bis-(3,5-dimethyl-4-hydroxyphenyl)-2-methylbutane and 1,1-bis-(3,5-dimethyl-4-hydroxyphenyl)-cyclohexane.

Copolycarbonates which are preferred according to the invention contain bisphenol A and 1,1-bis-(4-hydroxyphenyl)-cyclohexane (bisphenol Z).

Stabilizers against moisture, heat stabilizers and stabilizers against the action of UV light can also be added to the solutions of the polyaryl sulphone/polycarbonate mixtures according to the invention before the casting operation. The cast films obtainable according to the invention have a high tensile strength (according to DIN 53 455), a good elongation at break (according to DIN 53 455) and a surprisingly good resistance to stress-cracking.

The films obtainable according to the invention can be employed as dielectric films in capacitors and as core insulation, layer insulation or final insulation in transformers. When the films are heated to temperatures above the glass transition temperature, the monoaxial stretching results in a shrinkage which can be advantageously utilized in the production of capacitors and coils, using a shrinkage method.

The cast films obtainable according to the invention thus have a pattern of properties which meets the requirements of cast films in general, but in particular as insulating film for the electrical industry.

EXAMPLES

EXAMPLE 1

70 kg of a linear polyaryl sulphone prepared by condensation of 4,4'-dichlorodiphenyl sulphone and bis-2-(4-hydroxyphenyl)-propane and having a $\overline{M}w$ of 20,000 and 30 kg of a polycarbonate based on bisphenol A and having a $\overline{M}w$ of 95,000 are dissolved together in 325 liters of $CH_2Cl_2$. 20 kg of ethylene-glycol-monomethylether as a solubilizing agent are added to stabilize the solution and the viscosity of the solution is adjusted to 14 Pas at 20° C. The solution is degassed and filtered and cast on a drum casting machine to give a film 15 μm thick. The film is dried in a drying cabinet to a residual solvent content of less than 5%.

The film is then stretched in a longitudinal direction at a ratio of 1:3 on a roller stretching machine at temperatures above the glass transition temperature. The characteristic values are shown in the following Table 1.

EXAMPLE 2

A solution prepared according to Example 1 is cast on a belt casting machine to give a film 120 μm thick. The film is stretched at a ratio of 1:2, according to Example 1, to give a film 60 μm thick.

EXAMPLE 3

A solution prepared according to Example 1 is cast on a drum casting machine to give a film 8 μm thick. The film is stretched at a ratio of 1:4 according to Example 1, to give a film 2 μm thick.

TABLE 1

| Film According to Example | | 1 | 2 | 3 | Not Stretched |
|---|---|---|---|---|---|
| Tensile strength/MPa according to DIN 53 455 | longitudinal | 89 | 88 | 88 | 77 |
| | transverse | 60 | 60 | 60 | 69 |
| Elongation at break/% according io DIN 53 455 | longitudinal | 73 | 60 | 80 | 10 |
| | transverse | 29 | 23 | 30 | 7 |
| Elongation at break/% after 10 seconds in toluene/n-propanol/1:3 | longitudinal | 55 | 55 | 55 | 5 |

What is claimed is:

1. In the process for the production of cast films from mixtures of 90 to 60% by weight of a linear polyaryl sulphone having weight-average molecular weight of 15,000 to 55,000 and 10 to 40% by weight of a linear polycarbonate having a weight average molecular weight of 65,000 to 120,000, the improvement comprising
   (i) stabilizing the solution of the polymer mixture by adding thereto 5 to 30% by weight, relative to the weight of the solid polymer mixture, a solubilizing agent selected from the group consisting of ethylene-glycol-monomethylether and toluene said solution of the polymer mixture comprising a mixture of a solution of said polyaryl sulphone in a solvent selected from the group consisting of methylene chloride, ethylene chloride, trichloroethane and chloroform and a solution of said polycarbonate in a solvent selected from the group consisting of methylene chloride, ethylene chloride, trichlorethane, chloroform, m-cresol and pyridine; and
   (ii) stretching the dried cast film at a stretching ratio between 1:2 and 1:5 at a temperature above the glass transition temperature of said polyaryl sulphone/polycarbonate mixture.

2. The process of claim 1 wherein said linear polycarbonate is a homopolycarbonate of bisphenol A.

* * * * *